(12) United States Patent
Petzold et al.

(10) Patent No.: US 9,387,848 B2
(45) Date of Patent: Jul. 12, 2016

(54) METHOD FOR BROADENING THE FUNCTION OF A TRANSMISSION BRAKE

(71) Applicant: ZF Friedrichshafen AG, Friedrichshafen (DE)

(72) Inventors: Rainer Petzold, Friedrichshafen (DE); Mario Steinborn, Friedrichshafen (DE); Ulrich Reith, Schlier (DE); Wolfgang Groner, Friedrichshafen (DE); Rupert Kramer, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 404 days.

(21) Appl. No.: 13/929,984

(22) Filed: Jun. 28, 2013

(65) Prior Publication Data

US 2013/0296134 A1 Nov. 7, 2013

Related U.S. Application Data

(62) Division of application No. 11/663,407, filed as application No. PCT/EP2005/007696 on Jul. 15, 2005, now abandoned.

(30) Foreign Application Priority Data

Sep. 22, 2004 (DE) .......................... 10 2004 045 828

(51) Int. Cl.
*B60W 10/00* (2006.01)
*B60W 10/196* (2012.01)
(Continued)

(52) U.S. Cl.
CPC .............. *B60W 10/196* (2013.01); *B60W 10/02* (2013.01); *B60W 10/10* (2013.01); *B60W 10/18* (2013.01);
(Continued)

(58) Field of Classification Search
CPC ................. F16H 2061/0411; F16H 2061/047; F16H 2061/1212; F16H 2061/205; F16H 61/403; B60W 10/10; B60W 10/196; Y10T 477/647

USPC ............... 701/51, 84, 87; 192/219, 220, 223; 477/92, 94
See application file for complete search history.

(56) References Cited

U.S. PATENT DOCUMENTS 3,667,309 A 6/1972 Franz et al.
4,614,126 A 9/1986 Edelen et al.
(Continued)

FOREIGN PATENT DOCUMENTS

DE 196 52 916 A1 6/1998
DE 198 40 288 A1 8/1999
(Continued)

OTHER PUBLICATIONS

European Search Report Corresponding to EP 07 02 4741 mailed Aug. 27, 2008.
(Continued)

*Primary Examiner* — Jack W Keith
*Assistant Examiner* — Chuong P Nguyen
(74) *Attorney, Agent, or Firm* — Davis & Bujold, PLLC; Michael J. Bujold

(57) ABSTRACT

A method of controlling and regulating a transmission brake which, for the purpose of synchronization, determines a target rotational speed of a shaft to be synchronized on the basis of an actual rotational speed of a transmission shaft, and controls a transmission brake such that the determined target rotational speed is set for the shaft that is to be synchronized. The transmission brake also carries out additional functions. These functions require no, or only minimal, additional hardware complexity in a cost-neutral way, but considerably increase the functional and practical value of the transmission brake. The comfort and speed of shifting operations, the protection or, as the case may be, the detection of error states in sensors, a clutch, a main clutch or a motor control are improved, and undesirable transmission states avoided. It is also possible to account for and influence other conditions, such as the operation of ancillary devices.

17 Claims, 1 Drawing Sheet

(51) Int. Cl.
*F16H 61/04* (2006.01)
*B60W 10/10* (2012.01)
*B60W 10/02* (2006.01)
*B60W 10/18* (2012.01)
*F16H 61/12* (2010.01)
*F16H 61/20* (2006.01)

(52) U.S. Cl.
CPC .... *F16H 61/0403* (2013.01); *F16D 2500/5018* (2013.01); *F16D 2500/50293* (2013.01); *F16D 2500/5108* (2013.01); *F16H 61/12* (2013.01); *F16H 2061/047* (2013.01); *F16H 2061/0411* (2013.01); *F16H 2061/1212* (2013.01); *F16H 2061/205* (2013.01); *F16H 2302/04* (2013.01); *F16H 2312/08* (2013.01); *F16H 2342/04* (2013.01); *Y10T 477/647* (2015.01)

(56) References Cited

U.S. PATENT DOCUMENTS

| | | | |
|---|---|---|---|
| 5,560,249 | A | 10/1996 | Nellums |
| 5,593,363 | A * | 1/1997 | Asai .................. B60T 1/06 477/71 |
| 5,887,434 | A | 3/1999 | Arnell et al. |
| 5,911,646 | A * | 6/1999 | Tsutsui ............... B60T 7/122 192/13 A |
| 6,022,295 | A | 2/2000 | Liu |
| 6,024,667 | A | 2/2000 | Krohm et al. |
| 6,223,592 | B1 | 5/2001 | Genise |
| 6,246,941 | B1 | 6/2001 | Sayman |
| 6,461,273 | B1 | 10/2002 | Davis et al. |
| 6,866,612 | B2 | 3/2005 | Tokura et al. |
| 7,337,052 | B2 | 2/2008 | Steinborn et al. |
| 7,370,548 | B2 | 5/2008 | Bachmann et al. |
| 7,396,314 | B2 | 7/2008 | Winkel et al. |
| 8,718,882 | B2 * | 5/2014 | Gansohr ............ F16H 61/0403 477/34 |
| 8,939,870 | B2 * | 1/2015 | Wurthner ............... B60W 10/02 477/186 |
| 2003/0130088 | A1* | 7/2003 | Schiele ........... B60W 30/18027 477/39 |
| 2003/0163235 | A1 | 8/2003 | Tokura et al. |
| 2004/0189081 | A1 | 9/2004 | Hardtle et al. |
| 2004/0209733 | A1 | 10/2004 | Bates et al. |
| 2004/0224821 | A1 | 11/2004 | Hausner et al. |
| 2006/0166788 | A1* | 7/2006 | Buchhold ............... F16D 48/06 477/166 |
| 2007/0043495 | A1 | 2/2007 | Bates et al. |
| 2007/0225887 | A1 | 9/2007 | Morris |

FOREIGN PATENT DOCUMENTS

| | | |
|---|---|---|
| DE | 101 35 744 A1 | 2/2003 |
| DE | 103 28 019 A1 | 1/2004 |
| DE | 102 44 026 A1 | 4/2004 |
| DE | 103 05 254 A1 | 8/2004 |
| EP | 0 686 789 A1 | 12/1995 |
| EP | 1 013 973 A2 | 6/2000 |
| EP | 1 262 360 A1 | 12/2002 |
| EP | 1 266 788 A2 | 12/2002 |
| EP | 1 273 831 A2 | 1/2003 |
| JP | 61-81047 U | 5/1986 |
| JP | 2000-145936 A | 5/2000 |
| JP | 2002-130458 A | 5/2002 |
| JP | 2004-528519 A | 9/2004 |
| WO | 02/099318 A1 | 12/2002 |
| WO | 2004/000599 A2 | 12/2003 |

OTHER PUBLICATIONS

European Search Report Corresponding to EP 07 02 4740 mailed Aug. 27, 2008.

* cited by examiner

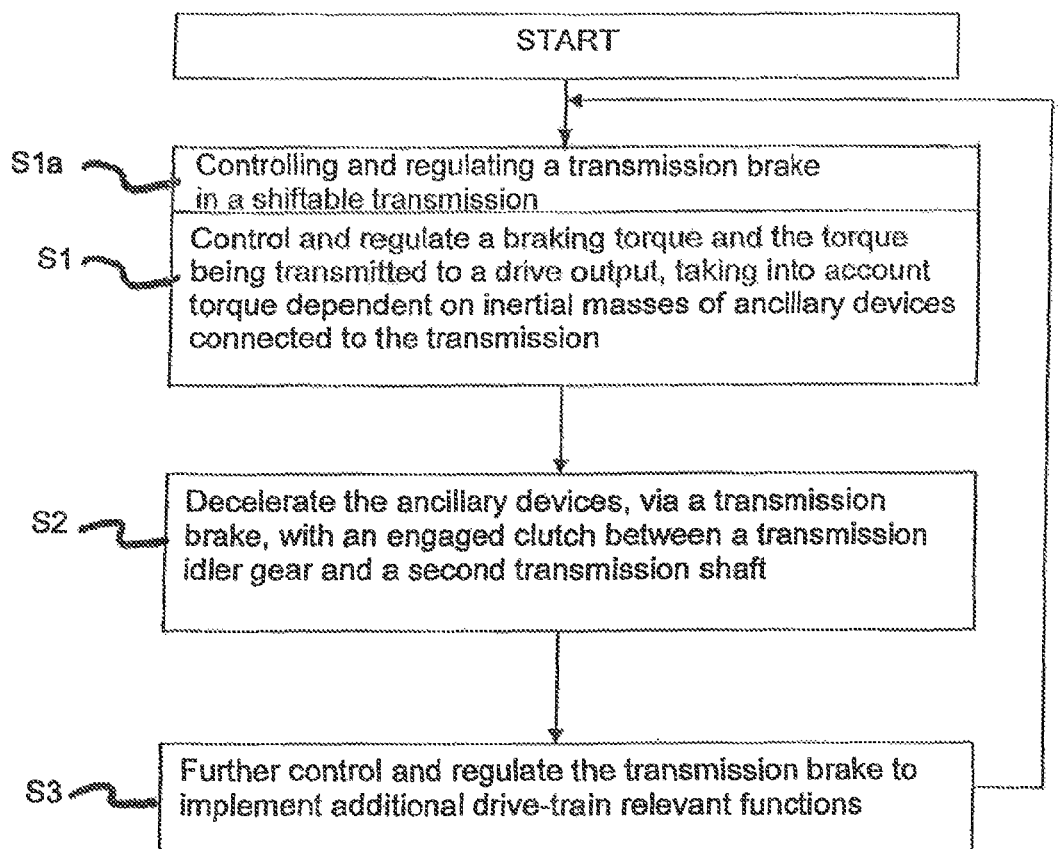

METHOD FOR BROADENING THE FUNCTION OF A TRANSMISSION BRAKE

This application is a divisional of U.S. patent application Ser. No. 11/663,407 filed Sep. 17, 2007, which is a national stage completion of PCT/EP2005/007696 filed Jul. 15, 2005 which claims priority from German Application Serial No. 10 2004 045 828.6 filed Sep. 22, 2004.

FIELD OF THE INVENTION

The invention relates to a method for broadening the function of a transmission brake in a conventional transmission.

BACKGROUND OF THE INVENTION

Conventional transmissions have been used for some time in different types of motor vehicles. The predominant construction method is the so-called countershaft construction method, in which the torque of an input shaft of the gearbox is transmitted to a countershaft and from there to an output shaft. Located on the shafts is a plurality of gearwheel trains corresponding to the number of gears. Each gearwheel train has at least one idler gear, which is mounted in a rotatable manner on a shaft, thereby enabling the simultaneous meshing of the gearwheel trains with different transmission ratios. When a gear is engaged, the idler gear of the corresponding gearwheel train is fixed in a torque-proof manner to the corresponding shaft by means of a coupling element, thereby enabling torque flow from the input shaft via the countershaft to the output shaft.

In order to enable the transmission of high torque with a small construction volume and low component costs, positive locking coupling devices, or as the case may be, clutches, are used almost exclusively. In order to change gears quickly, without shock, and with low noise and wear, it must be assured, when engaging a gear, that the parts to be connected in a torque-proof manner by means of the positive coupling device rotate at approximately the same rotational speeds. For this synchronization, small-dimension friction clutches can be used inside the transmission, whereby at least one separate clutch for synchronization is provided for each gear train.

The complexity and number of transmission components can, however, be reduced in that the synchronization is achieved by means of a corresponding adjustment of the ratio of the input speed to the output speed of the transmission. As the output shaft of the transmission is, as a rule, constantly connected in a drive-effective manner with the driven wheels of the motor vehicle, its rotational speed is determined by the driving speed of the motor vehicle. For that reason, the synchronization is usually done through the corresponding adaptation of the rotational speed of the input side of the transmission. If it is necessary to increase the speed of one shaft, as in the case of down-shifting, for example, this is implemented by means of the driving motor and the main clutch of the motor vehicle. For necessary deceleration of a shaft, a transmission brake is provided at least on the drive side of the drive train, within the transmission housing or immediately adjacent to the gearbox, which acts, for example, on the countershaft. When up-shifting, the transmission brake has the task of slowing the input side of the transmission to approximately the rotational speed of synchronization.

Unless expressly stated otherwise, the word clutch will be used below to designate a clutch that is located inside the gearbox, enables torque transfer between a shaft and an idler gear, and which usually, but not necessarily, is a positive clutch. In contrast, the clutch that implements torque transfer between the drive motor and the transmission, and which is usually shifted by means of a clutch pedal in motor vehicles with a manual transmission, is designated a main clutch.

The transmission brake can be actuated hydraulically, pneumatically, or electromagnetically. Even though an unregulated transmission brake might be sufficient in some cases, a transmission brake with adjustable braking force has considerable advantages in practice. This kind of transmission brake, for example, can be constructed as a brake that is actuated by two two-way valves, which are connected to the countershaft via a fixed transmission ratio.

While synchronization by means of a transmission brake can be easily implemented for automatic transmissions for motor vehicles, the functional principle of synchronizing transmission brakes can also be used for manual transmissions as well as for transmissions not used in motor vehicles.

A transmission brake is known from DE 196 52 916 A1. Here, a determined output rotational speed of the transmission and knowledge of the preselected transmission ratio are used to determine a target coupling rotational speed, and in cases where the target coupling rotational speed is lower than the determined actual rotational speed, a target braking gradient is determined and adjusted by means of valves. After the countershaft has reached the target coupling rotational speed via the braking action of the transmission brake, the gear is engaged and the brake disengaged. This solution is suitable for regulating the synchronization of normal shifting operations, however, with respect to regulation, is restricted to the minimum required basic function and by no means exhausts the technical possibilities of this kind of brake.

Against this background, the inventive task is to present a control method, or as the case may be, a regulating method, for a transmission brake, by means of which, without significant additional hardware expenses, the function of this brake can be significantly broadened. For purposes of linguistic simplicity, the term "control" will henceforth also encompass the term "regulation." It will be obvious from the context whether control or regulation is meant, or it will be specified in the concrete configuration of this type of control.

The solution of this task is seen in the characteristics of the main claim, while advantageous embodiments and further developments of the invention will be apparent from the dependent claims.

SUMMARY OF THE INVENTION

The invention is based on the insight that broadening the functional range of a transmission brake can, without appreciable increase in hardware complexity, result in considerable improvement of the comfort and speed of shifting operations; protection from, or as the case may be, the identification of error statuses in the sensors, clutch, main clutch and engine management system, and the avoidance of unwanted states of the transmission. In addition, it is also possible to take into account and to beneficially influence additional conditions that were not previously taken into account, such as the operation of ancillary devices.

BRIEF DESCRIPTION OF THE DRAWING

The single FIGURE shows an embodiment of the method of controlling and regulating a transmission brake.

DETAILED DESCRIPTION OF THE INVENTION

As shown in the single Figure, the invention is thus based on a method for controlling and regulating a transmission brake in a conventional transmission (step S1a), which, for the purpose of synchronization, and based on a actual rotational speed of a gearshaft, determines a target rotational speed of a shaft that is to be synchronized and controls and/or regulates a transmission brake in such a way that the gearshaft that is to be synchronized reaches the determined target rotational speed. In order to solve the set task, the invention also provides for control of the transmission brake to be used for carrying out drive-train relevant functions in addition to that of simply synchronizing the transmission (step S3).

These drive-train relevant additional functions are described individually in the dependent claims. Their common characteristic is that they can be implemented without, or with only minimal additional hardware requirements, and can therefore be implemented virtually without additional cost, at the same time as they considerably improve the functional range and therefore the practical value of the transmission brake.

In a first embodiment, the invention provides for the torque, which is conditional on the inertial masses of the ancillary drive systems connected to the gearbox, to be taken into account for the control and/or regulation of the braking torque (step S1), and that ancillary drive systems are decelerated by the transmission brake with an engaged clutch (step S2). Ancillary drive systems shall be understood here as transmission output shafts which enable the operation of units or devices by the drive motor of the motor vehicle in addition to the usual gears that act on the driving wheels of the motor vehicle. These units or devices can be intended for operation when the vehicle is at a standstill or during drive operation.

Ancillary outputs coupled to the transmission, or as the case may be, the units or devices connected to the ancillary drives, may, depending on their type and operating conditions, have considerable rotational masses, which only diminish slowly when coupled with an open main clutch to the output side of the transmission, thus keeping the rotational speed on the output side of the transmission at a relatively high level for an extended period of time.

For safety reasons, it desirable to create the possibility, through control processes, of decelerating these ancillary drives and thus considerably reducing the follow-up time. However, it is very complicated and expensive to install a separate brake in each ancillary drive, or in each unit or device that is supposed to be driven, for this purpose alone. In terms of the invention, the transmission brake that is present in any case can assume this function without additional component costs by initially opening only the main clutch, thereby cutting the connection to the drive motor, when the ancillary drive is shut down. The ancillary drive that is running down now rotates the gearbox parts involved and can be decelerated via the transmission brake. There is, of course, still the option of opening the clutch and coupling the ancillary drive into the torque flow and letting the ancillary drive run down without braking.

A further application of this method for decelerating ancillary drives results from the fact that ancillary drives with a low rotational speed, or which are stationary, can only be coupled into the torque flow of the transmission without having complicated friction clutches of their own if the shaft that is to be synchronized has at least approximately the same synchronous rotational speed, which in this case means almost standing still. If an ancillary output is driven by the transmission, and is supposed to continue being driven, one would have to wait after opening the main clutch and therefore uncoupling the motor vehicle drive train to engage the second ancillary output until the first ancillary drive has at least almost run down, meaning that the shaft that is supposed to be synchronized is almost at a standstill. This can take some time, depending on the rotational speed and the rotational mass of the ancillary drive. This time can be considerably shortened with the method according to the invention, if the transmission brake, with a closed clutch between the transmission and the already engaged ancillary drive, and with an open main clutch, is used to decelerate the ancillary shaft as well as the shaft that is supposed to be synchronized.

It is also possible that the motor vehicle is supposed to be drivable with an engaged ancillary drive. If a common countershaft is provided in the transmission, upon which the idler gears are disposed comprising parts of the gearwheel trains of the gear-speed settings, and if in addition, there are one or more idler gears, which mesh with the gears on separate output shafts of the ancillary drives, the countershaft must be reduced to approximately the synchronous rotational speed, in order to shift into a higher drive gear. However, because in this case the rotational speed of the countershaft is kept temporarily at approximately the same previous level due to the ongoing rotation of the ancillary drive, which results from its inertial rotational mass, the synchronization can take a long time without special consideration of the ancillary drive.

Therefore, with an engaged ancillary output, the invention provides for the braking torque from the transmission brake to be increased relative to the braking torque in simple drive operation without an engaged ancillary output, in order to decelerate the ancillary output within a short time in such a way that the countershaft achieves the new synchronous rotational speed. This can involve the use of fixed braking torque increases for certain ancillary outputs; the added braking torque can be read out from a table, depending on the type of ancillary output and its rotational speed or depending on the reaction of the rotational speed of the countershaft; or any other control and regulation method can be used that produces a controlled increase in the braking torque of the transmission brake with an engaged ancillary output.

In a second embodiment of the method according to the invention, a transmission brake used to synchronize the transmission is utilized in a special mode to secure the motor vehicle against unintentional coasting.

There are many known processes and devices to prevent unintentional coasting of a stationary motor vehicle without action being taken by the driver. They usually operate with automatic control of the main brake or the emergency brake. While systems that act on the emergency brake usually require actuators that are used exclusively for this purpose, which makes the vehicle more expensive and increases the weight of the vehicle, the required actuators for systems that act on the main brake are already present in modern vehicles.

In principle, however, it is not desirable to increase the complexity of a highly safety-relevant system, such as the brake control, through additional functions. This disadvantage is avoided by using the transmission brake to secure the vehicle against coasting. As the transmission brake is intended only to prevent the coasting of a stationary vehicle, a relatively small brake can be used, so that the transmission brake can also take on this function, in many cases, without being made larger, and in particular, without requiring additional brake piston sections or special devices intended exclusively for this purpose. This is even more applicable, because due to the gear transmission ratio and also to upstream ratios, for example of an axle gear or a power divider, the torque necessary to hold the vehicle can be greatly reduced.

Even when the braking torque produced by the transmission brake, or a larger version of the same, is not sufficient to keep the vehicle stationary on a steep uphill grade, the inventive coasting stop can nevertheless be advantageously employed in a majority of cases of use in a motor vehicle. While it is highly unlikely that a driver will stop on a steep upward grade without anticipating that the vehicle will roll backward and counteract this by manually engaging a brake, hardly perceptible downhill grades, or even only uneven areas of the road surface, for example, at a traffic light, can often lead to unintentional coasting of the motor vehicle. The necessary securing of a bus at a bus stop also requires no major braking force, so that the transmission brake can easily assume this function.

If needed, the transmission brake can be given a more robust form in order to better perform the anti-coasting function. This more robust form can also benefit the other functions described here.

In a special further development of this function of securing a motor vehicle against unintentional coasting, a rocking function to get out of ruts can be realized. If a vehicle becomes stuck in a rut, it can often get out on its own power, if it is systematically and alternately driven a short distance forward and backward, if the vehicle also exploits the potential energy gained each time, along with the drive energy transferred to the wheels, in order to come to a stop a little higher up on the other side of the rut, until the wheel finally rolls over the side of the rut. In doing this, it is important to lose as little as possible of the achieved height when the wheel of the vehicle rolls back down into the rut while the driver switches between forward and reverse gears. Having said that, the brake should be completely disengaged when the driver starts the next rocking movement with an engaged forward or reverse gear. An anti-coasting mechanism that interacts with the emergency brake or the main brake can perform this function in a satisfactory manner only with considerable regulating effort, whereas a transmission brake can be controlled with minimal effort so as to prevent rolling back at precisely the point when the gear that is supposed to be shifted next is not yet engaged, while the brake is immediately released when the gear is engaged.

A third embodiment of the inventive method provides for a torque that is applied to the transmission via the main clutch to be compensated for, wholly or in part, through control of the transmission brake. It can be particularly useful, for example, when starting up, to initially intensify the torque present in the transmission, so that the vehicle is prevented from coasting backward when starting on an incline. Even when the actual torque set by the main clutch exceeds the target torque, it can be compensated for by a corresponding braking torque of the transmission brake. In the event that the torque transmitted by the main clutch is also supposed to be reduced, the transmission brake can reduce the torque applied to the output shaft of the gearbox until the main clutch is correspondingly positioned. This enables slower and thus more precise positioning of the clutch, while quickly achieving the desired torque on the output side of the transmission at the same time. An additional useful application of this kind of method will be explained below.

When engaging a clutch, particularly when there is an attempt at rapid positioning of the main clutch, overshooting may occur. This can, for example, be due to a slight continuation of the movement of clutch components after the target position has been reached. The greater the actuation speed of the main clutch, the more it tends toward overshooting. In addition, undesirable torque peaks can also be produced on the transmission input shaft, for example, by rapid alteration of load and elastic deformation of parts of the drive train caused by this, which here too can be subsumed under the term overshooting. As this is a matter of processes of very short duration, regulation by means of control of the motor rotation speed is too slow and therefore not useful.

By means of a fourth embodiment of the invention, full or partial compensation for overshooting and the accompanying brief rise in one of the torques present on the transmission input shaft is achieved by means of corresponding control of the transmission brake. The overshooting can be registered by sensors. However, it will often be possible to at least largely reduce the perceptible consequences of overshooting for the vehicle occupants by means of simple control input for the transmission clutch. It can be provided, for example, that a brief braking pulse is produced via the transmission brake, starting at a specified positioning speed of the drive clutch at a specified point in time after beginning or complete power transmission by the drive clutch. Of course, extensive control and regulating methods are conceivable, which, for example, differentiate between different engagement circumstances and potentially determine the point in time, duration, and strength of the braking pulse of the transmission brake by the use of additional parameters. This can be done by reading the values stored in tables or by means of calculations made in a relevant control computer.

In the case of dog-type constant-mesh countershaft transmissions in particular, but also with other kinds of transmission, situations may arise in which two claws or in general, two transmission components are positioned in such relation to each other that engagement is impossible with the normal torque transfer capacity, as raised components face each other, and positive engagement is prevented. Then the transmission cannot be shifted.

These kinds of tooth-on-tooth positions in the transmission can be resolved in a fifth embodiment of the inventive method by applying constant or pulsing braking torque by means of the transmission brake. Unlike the method for dissolving such positions, which is dependent on initial separation of the adjacent clutch components and an engagement process putting the clutch elements into an arbitrary, more favorable relative position, the tooth-on-tooth position can be eliminated quickly and reliably by this method, without first having to separate the clutch elements. The dissolution of these tooth-on-tooth positions can therefore be implemented particularly quickly and reliably, as well as hardly perceptibly for the occupants of the vehicle. Of course, it is also possible to first reduce the pressure of the adjacent clutch elements or to separate the clutch first, in order to minimize wear on the clutch components, for example. In this case as well, a smaller rotational speed difference can be reliably achieved through the production of a braking torque by the transmission brake, so that during re-engagement a repeat of the tooth-on-tooth position is virtually impossible.

A sixth embodiment of the inventive method provides for the clutch path signal of the main clutch to be checked for plausibility and/or calibrated through targeted control of the transmission brake. This can be important, for example, in order to check or calibrate the sensor values in the case of sensors that can be influenced by changing magnetic fields, when the sensor values are erroneous, but which nevertheless deliver values that are within allowable limits.

In order to do this, the transmission is placed in a neutral position and a defined torque is introduced by means of the transmission brake. When the main clutch is then positioned so that the torque applied to the transmission by the drive motor via the clutch is not sufficient to raise the transmission input rotational speed against the transmission brake, and the main clutch is then adjusted so that the torque transmitted by the clutch is just barely sufficient to raise the transmission input rotational speed, a defined engagement path is then set or, as the case may be, can be ascertained, which can be used independently, for example of construction-dependent deviations or clutch wear for the calibration of the clutch path signal, or as the case may be to check it.

If the braking torque of the transmission brake is known, the torque transmitted by the clutch corresponds, in the clutch position in which the transmission input shaft is currently turned against the braking effect of the clutch, to the braking torque of the transmission brake.

In order to determine the clutch path in which the torque conducted by the main clutch exactly corresponds to the braking torque, the clutch can, in a modification of the method that is also based on a transmission in a neutral position, a specific defined braking torque of the transmission brake and a closed main clutch, be disengaged such that the torque transferred from the drive motor via the clutch to the transmission is no longer sufficient to turn the transmission input shaft against the braking torque of the transmission brake. If both described methods are implemented, the hysteresis of the clutch can be deduced from the difference between the derived values, or as the case may be, the clutch paths.

If special demands are made for the accuracy of the calibration, the torque losses that occur inside the transmission can also be taken into account during the evaluation.

In a seventh embodiment of the inventive method, the transmission brake can be calibrated by means of a simple permutation of an independent input parameter and a parameter that is supposed to be calibrated or monitored for plausibility through targeted control of the torque that is to be transferred by the main clutch to the transmission input shaft, and/or the connection between an actuation signal of the transmission brake and the developing braking torque can be checked for plausibility, or as the case may be, calibrated.

Thereby, in modification of the method described above, in a neutral position of the transmission, defined torque will be applied to the input shaft of the transmission by means of a main clutch and a drive motor, thereby deriving the signal value, or as the case may be, the appropriate braking position at which the braking torque produced on the transmission brake is just as large as the torque directed into the transmission input shaft. Here too, analogous to the method described above, the transmission brake can be gradually released until rotary motion of the transmission begins, or the transmission brake is increasingly actuated, until the braking torque is just sufficient to prevent rotary motion of the input shaft of the transmission. By using both methods, hysteresis behavior can be determined, and, by taking into account internal torque losses in the transmission, the accuracy of the method can be increased.

Of course, instead of reducing or increasing the braking torque of the transmission brake, the braking torque of the transmission brake can alternatively be kept constant, and the main clutch can be gradually engaged or disengaged, until incipient slipping of the main clutch is just perceived, or as the case may be, an end to the slipping of the main clutch, if these clutch positions, with the aid of known clutch characteristics, can be associated with a certain torque that is transferred to the transmission.

An eighth embodiment of the inventive method provides for the possibility of checking for plausibility and/or calibrating a motor torque signal emitted by a motor control with the aid of a defined braking torque produced by the transmission brake. When the transmission is in a neutral position and the main clutch is engaged, the motor torque signal must correspond to the braking torque produced by the transmission brake. If these values do not coincide, an error must be assumed. If necessary, additional torque can be taken into account that might originate from friction in the transmission, for example.

A similar approach can be used in a ninth embodiment in order to check, by means of systematic control of the transmission brake, whether the transmission is in neutral position. When a braking torque is applied using the transmission brake with a disengaged main clutch, the rotational speed of the braked shaft, with an engaged gear, changes comparatively slowly and proportionally to the change in vehicle speed, while the change in rotational speed in the neutral position of the transmission takes place much faster, as only a few transmission components, and not the entire vehicle are braked, and in addition the change in speed of the braked transmission shaft does not take place proportionally to the change in the driving speed of the vehicle. Both criteria can be evaluated individually or in combination to establish whether a gear is engaged or not.

It is already known that in order to control a transmission brake, the target speed of a shaft and its actual speed must be determined and the braking gradient must be controlled on the basis of the difference between the two speeds. A tenth embodiment of the inventive method provides for an improvement, in that when adjusting a speed gradient, in addition to the rotational speed difference between the target and the actual speed of a braked shaft, at least one limit value is taken into account, which is dependent on the construction or the operating conditions of the transmission gear, in particular a maximum allowable speed gradient and/or a temperature limit value. In this way, components can be protected against overload, and, for example, the braking torque can be limited depending on the state of wear of the transmission brake or the determined or estimated temperature of the brake lining.

In addition, the inertial mass to be braked, or the energy of rotation to be reduced, can be determined or estimated, and the braking torque, depending on the inertial mass to be braked and/or the energy of rotation to be reduced, can be controlled or regulated. This eleventh embodiment of the invention is particularly advantageous when the inertial masses of the rotating components to be braked are very different due to different masses and diameters of the engaged gears, or due to coupled additional drives, because in such cases a defined speed progression can only be set by taking these different masses into account, or as the case may be, in connection with the speed of the varying energy of rotation to be reduced. It is particularly advisable, in the case of larger rotating masses, or as the case may be the larger amounts of energy that have to be reduced for this reason, to reinforce the braking force, in order to make the shift times largely independent of the cited parameters.

It is also useful to control or regulate the transmission brake depending on at least one parameter that is interpreted as a standard value for a desired shifting speed or a certain shifting comfort. While it is common in the case of automatic transmissions to provide a choice of two or more different shift-pattern maps, which, for example, are optimized for racing operation with optimum acceleration values, or for economical operation with minimum fuel consumption, the actual gear-shifting process has not previously been optimized for the needs or requirements of different driving modes or driving conditions.

With the inventive method, it is possible, according to a twelfth embodiment, to selectively influence the speed and comfort of gear-shifting by varying the deceleration values realized by means of the brake. In this way, in a racing mode, the braking torque can be increased compared to normal operation, thereby achieving shorter shift times. Inversely, in order to achieve particularly comfortable shifting characteristics with little jerking and wear, the braking torque realized by the transmission brake can be reduced compared to normal operation.

In this connection, it is irrelevant how the parameter is determined that serves as the standard value for a certain shift comfort or a desired shift speed. The parameter can, for example, be explicitly specified by the driver, or it can be automatically changed after conventional manual changeover of the shifting characteristics; it can be obtained on the basis of drive parameters; or it can be read out after personalization of a memory that is, for example, located in a motor vehicle key. In the simplest case, it is a matter of switching between two discrete values. However, a larger number of discrete values is conceivable, or a continuum as well, for example in the form of a throttle. The scope of the invention also takes into account a plurality of parameters, such as shifting frequency, acceleration values, or motor values, as long as these values can be seen as an intermediate step in determining a parameter, or in any case, culminate in an influencing variable affecting the strength of the transmission brake's effectiveness in achieving different shifting characteristics.

In a thirteenth embodiment of the invention, the braking torque to be set is determined by taking into account the known torque of inertia of the masses be braked and/or the existing rotation gradients on the transmission brake as well as optionally the natural rotation gradients of the masses to be braked and/or the temperature of the transmission. In this way, it is possible to set a considerably more exact braking torque, with respect to comfort, shift speed, wear, and noise development, as well as achieve the at least approximately equal or selectively different shifting characteristics for shifting between different gears. If required, the shifting operation can also be made particularly wear-resistant.

Unless, as described above, the main clutch is disengaged when actuating a transmission brake, it is also always possible, according to a fourteenth embodiment of the invention, to engaged the main clutch, or for it to remain engaged, at least under motor-operation conditions, or as the case may be, to engage it, or as the case may be to keep it engaged by means of slippage, under motor operation conditions in which the motor itself provides a braking torque and in which the transmission brake, with a disengaged clutch, would be activated.

In this way, strain on the transmission brake can be relieved, and in addition, the drive motor can be driven in so-called trailing mode after shutting off the fuel supply. In such cases, for the control of the transmission braking torque, there is a useful determination of and a corresponding allowance for the motor braking torque that is applied via the main clutch to the transmission.

The invention claimed is:

1. A method of controlling and regulating a transmission brake in a shiftable transmission, the method comprising the steps of:
   during synchronization determining, with a control unit, on a basis of an actual detected rotational speed of a transmission shaft, a target rotational speed of a shaft to be synchronized,
   at least one of controlling and regulating the transmission brake, which is located within the shiftable transmission, with at least one of a hydraulic, a pneumatic, or an electromagnetic valve to slow rotation of the shaft to be synchronized such that the shaft to be synchronized assumes the determined target rotational speed,
   using the control and regulation of the transmission brake for synchronizing the shaft to be synchronized in a gearshift and also for carrying out additional drivetrain-relevant functions, and
   eliminating a tooth-on-tooth position of transmission components in relation to each other by applying, via the transmission brake, one of a continuous and a pulsed braking torque to a transmission shaft connected to one of the transmission components so as to slow rotation of the one of the transmission components, in relation the other of the transmission components, and adjust a relative rotational position of the one of the transmission components in relation to each other of the transmission components, the tooth-on-tooth position of the transmission components being defined as a relative rotational position of the transmission components at which positive engagement of the transmission components is prevented.

2. The method according to claim 1, further comprising the step of taking torques induced by inertial masses of auxiliary units connected to the transmission into consideration during the control and regulation of the braking torque, and, with a clutch between a transmission loose gear and an engaged transmission shaft, braking auxiliary drive outputs via the transmission brake.

3. The method according to claim 1, further comprising the step of operating, with the control unit, the transmission brake, which is used for the synchronization of the transmission, in an operating mode of a vehicle to prevent the vehicle incorporating the transmission from inadvertently rolling.

4. The method according to claim 3, further comprising the step of controlling the transmission brake, during a rock-free function of the vehicle, to engage the transmission brake, and prevent the vehicle from inadvertently rolling to realize the rock-free function for the vehicle, the rock-free function being defined as a function in which the vehicle rock free from a lodged position.

5. The method according to claim 1, further comprising the step of at least partially offsetting a driving torque introduced into the transmission by a driving clutch, between the transmission and a vehicle drive engine, by actuating the transmission brake to apply a breaking torque in the transmission.

6. The method according to claim 5, further comprising the step of at least partially offsetting an undesirably high drive torque, which is caused by an overshoot during a fast engagement of the driving clutch and introduced into the transmission by the driving clutch, by applying a set braking torque to the transmission with the transmission brake.

7. The method according to claim 1, further comprising the step of checking, with the control unit, a clutch travel sensor signal of the driving clutch for at least one of plausibility and calibration by one of a targeted control and regulation of the transmission brake.

8. The method according to claim 1, further comprising the step of calibrating the transmission brake by at least one of:
   a targeted control of the torque transmitted by the driving clutch to the transmission input shaft, and
   a relationship between an actuating signal of the transmission brake and a plausibility checked of a set braking torque.

9. The method according to claim 1, further comprising the step of checking an engine torque signal output, via an engine controller, for at least one of plausibility and calibration by a defined braking torque applied by the transmission brake.

10. The method according to claim 1, further comprising the step of checking, via targeted actuation of the transmission brake, whether the transmission is in a neutral position.

11. The method according to claim 1, further comprising the step of considering a rotational speed difference between the target rotational speed and the actual detected rotational speed of the shaft to be synchronized as well as at least one limit value that depends on either design or operating conditions of the transmission brake for setting a rotational speed gradient.

12. The method according to claim 11, further comprising the step of considering at least one of a maximum admissible rotational speed gradient and a temperature limit value when setting the rotational speed gradient.

13. The method according to claim 1, further comprising the step of at least one of controlling and regulating the braking torque as a function of at least one of an inertial mass to be braked and a rotational energy of the one of the transmission components to be dissipated.

14. The method according to claim 1, further comprising the step of at least one of controlling and regulating the braking torque as a function of at least one parameter which is interpreted as a setpoint value for a desired shift speed.

15. The method according to claim 1, further comprising the step of taking into consideration at least known moments of inertia of masses to be braked and a present rotational speed gradient at the transmission brake the transmission braking torque to be set.

16. The method according to claim 15, further comprising the step of taking into consideration a rotational speed gradient of the masses to be braked by the transmission brake and a temperature of the transmission.

17. The method according to claim 1, further comprising the step of one of engaging the driving clutch, maintaining the driving clutch engaged, engaging the driving clutch with slip and maintaining the driving clutch engaged with slip at least under engine operating conditions in which the engine itself provides a braking torque (for example an overrun mode) and in which an activation of the transmission brake would take place with the driving clutch disengaged, and taking into consideration the engine braking torque, introduced into the transmission via the driving clutch, in determining the transmission braking torque to be set.

\* \* \* \* \*